United States Patent
Drouet et al.

(10) Patent No.: US 8,447,830 B2
(45) Date of Patent: May 21, 2013

(54) PRO-ACTIVE HTTP CONTENT DELIVERY

(75) Inventors: Francois-Xavier Drouet, La Gaude (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 1486 days.

(21) Appl. No.: 11/553,075

(22) Filed: Oct. 26, 2006

(65) Prior Publication Data

US 2007/0143484 A1 Jun. 21, 2007

(30) Foreign Application Priority Data

Dec. 15, 2005 (EP) .................... 05301061

(51) Int. Cl.
*G06F 15/16* (2006.01)
*G06F 15/173* (2006.01)
*G06F 15/177* (2006.01)

(52) U.S. Cl.
USPC ........... 709/217; 709/219; 709/224; 709/238; 709/200; 709/225

(58) Field of Classification Search
USPC ......................................... 709/217, 219, 224
See application file for complete search history.

(56) References Cited

U.S. PATENT DOCUMENTS

| 2002/0007374 | A1* | 1/2002 | Marks et al. | 707/513 |
| 2002/0147895 | A1* | 10/2002 | Glance et al. | 711/158 |
| 2007/0094208 | A1* | 4/2007 | Cerrato | 706/48 |
| 2007/0100798 | A1* | 5/2007 | Kapur | 707/3 |

* cited by examiner

*Primary Examiner* — Karen Tang
(74) *Attorney, Agent, or Firm* — Hoffman Warnick LLC; Andrea Bauer

(57) ABSTRACT

A method and systems for multicasting web content to users is disclosed. According to the invention, the behavior of Internet users is analyzed for determining user profiles. The data accessed by a user are multicast to all the users sharing the same profile. Optionally, information relative to the number of access to the document is provided to the users to whom data are multicast.

13 Claims, 3 Drawing Sheets

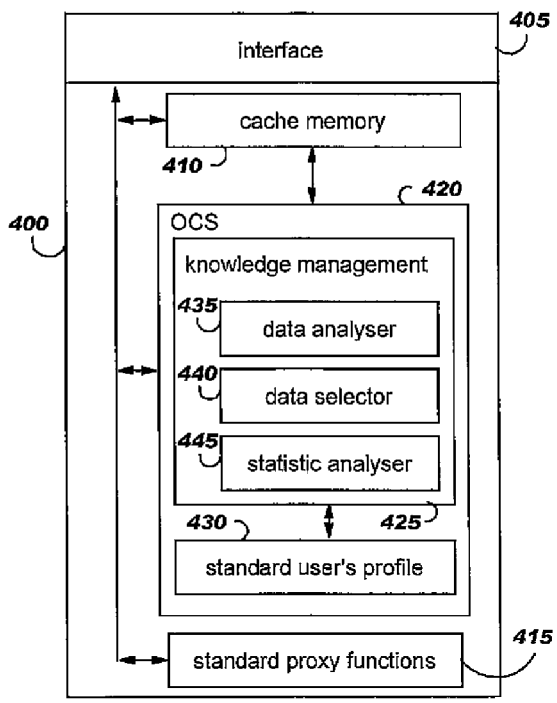
Figure 4
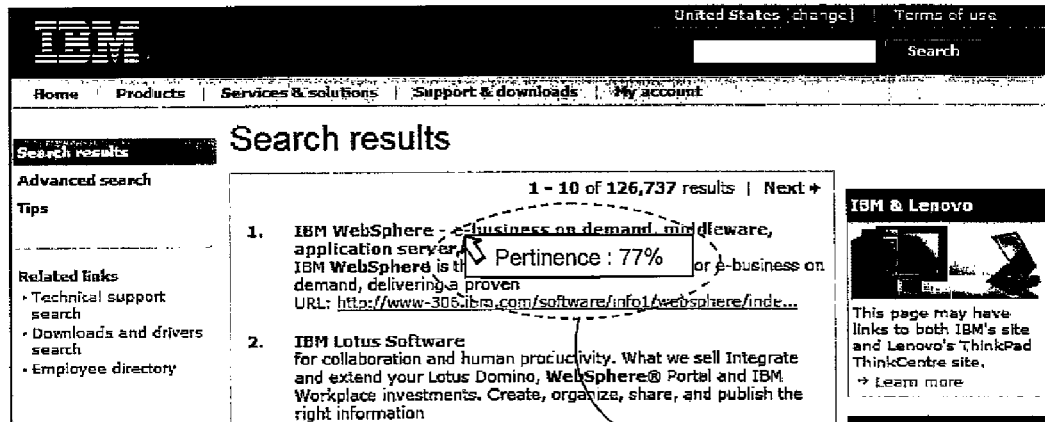
Figure 5
Figure 6

PRO-ACTIVE HTTP CONTENT DELIVERY

FIELD OF THE INVENTION

The present invention relates generally to data transfer in a computer network environment and more specifically to a method and systems for analyzing the behavior of HTTP requests at the HTTP proxy level so as to send pro-active information for optimizing the performance and minimizing the requested transmission bandwidth.

BACKGROUND OF THE INVENTION

The World Wide Web (WWW) is a system of Internet servers handling specially formatted documents, or files. The documents are formatted in a markup language called Hyper-Text Markup Language (HTML) that supports links to other documents, as well as graphics, audio, and video files. Such links, also referred to as hyperlinks, allow the user to jump from one document to another simply by clicking on hot spots. Accessing Internet servers on the World Wide Web is generally done through the use of a web client or browser.

A web client is a Graphical User Interface (GUI) that interfaces and communicates with a web server, using Hyper-Text Transfer Protocol (HTTP). Hypertext Transfer Protocol is the protocol behind the World Wide Web (WWW), that is invoked with every web transaction e.g., with every request for web documents or graphics, every click on hyperlinks, and every submission of forms. The WWW is about distributing information over the Internet, and HTTP is the protocol used to do so. The GUI has to be interfaced with a stack to submit the request according to HTTP to the Web Server.

HTTP is an application-level protocol for distributed, collaborative, hypermedia information systems. It is a generic, stateless, protocol which can be used for many tasks beyond its use for hypertext, such as name servers and distributed object management systems, through extension of its request methods, error codes and headers. A feature of HTTP is the typing and negotiation of data representation, allowing systems to be built independently of the data being transferred.

HTTP has been in use by the World-Wide Web global information initiative since 1990. The RFC 2616 defines the protocol referred to as "HTTP/1.1", and is an update to RFC 2068.

As defined in the RFC 2616, the request sent by a web client to a web server includes, within the first line of that message, the method to be applied to the resource, the identifier of the resource, and the protocol version in use, as follows:

```
Request = Request-Line ;
*(( general-header ;
| request-header ;
| entity-header ) CRLF) ;
CRLF
[ message-body ] ;
```

After receiving and interpreting a request message, a server responds with an HTTP response message as follows,

```
Response = Status-Line ;
*(( general-header ;
| response-header ;
| entity-header ) CRLF) ;
CRLF
[ message-body ] ;
```

In the World Wide Web, an HTTP proxy is an intermediary program which acts as both a server and a client for the purpose of making requests on behalf of other clients. Requests are serviced internally or by passing them on, with possible translation, to other servers. A proxy must implement both the client and server requirements of the RFC 2616. A "transparent proxy" is a proxy that does not modify the requests nor the responses beyond what is required for proxy authentication and identification. A "non-transparent proxy" is a proxy that modifies the requests and the responses in order to provide some added service to the user agent, such as group annotation services, media type transformation, protocol reduction, or anonymity filtering. Except where either transparent or non-transparent behavior is explicitly stated, the HTTP proxy requirements apply to both types of proxies.

Typically, the problems that occur when browsing the web are:
  bad response time;
  power consumption of small devices often connected to the network;
  network connection need;
  absence of resource optimization; and
  huge number of simultaneous access requests to same web sites at peak hours.

As a consequence, there is need for a method and systems for optimizing the resource and response time.

SUMMARY OF THE INVENTION

Thus, it is a broad object of the invention to remedy the shortcomings of the prior art as described above.

It is another object of the invention to provide a method for anticipating user requests and transmitting web content prior to receiving user requests.

It is a further object of the invention to provide a method for multicasting web content according to user's profiles.

It is still a further object of the invention to provide a method for multicasting web content according to user profiles and for informing users about relevant web content.

The accomplishment of these and other related objects is achieved by a method for multicasting data to users in a network environment from a proxy server comprising a set of predetermined user profiles, the method comprising:
  receiving at least one request from a user;
  accessing data requested by the user;
  determining a profile of the user among the set of user profiles;
  if the profile of the user is recognized among the set of user profiles,
    storing the accessed data within the proxy server;
    associating the stored data with the user's profile;
    accessing all the data associated with the user's profile; and,
    transmitting all the accessed data associated with the user's profile to the user,
  else, if the profile of the user is not recognized among the set of user profiles,
    transmitting the accessed data requested by the user to the user.

Further embodiments of the invention are provided in the appended dependent claims.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 4 shows another embodiment of the HTTP proxy of the invention.

FIG. 5 depicts an example of a web browser window of a user, that indicates the percentage of users, sharing the profile of the user, who have accessed the data.

FIG. 6 illustrates an example of a pro-active suggestion table.

DETAILED DESCRIPTION OF THE INVENTION

Statistical analysis shows that behavior of web users can be anticipated according to few parameters. Such parameters typically comprise the type of search data, for example worldwide or national events such as September, $11^{th}$ or hurricane Katrina, and the time at which the data is accessible, for example predetermined events such as scheduled news, and reality shows. For example, in the hours that followed September, $11^{th}$ events, millions of web users were connected to the Internet for reading news and looking at video clips. Likewise, each day, before going to work and/or coming back from work, thousands of web users are looking for news. Similarly, teenagers are looking for reality shows when coming back from school. Most of the web users are looking for a few web sites providing the text, video, or audio content they are looking for. Therefore, according to the invention, there is provided a method for multicasting web content according to user profiles based on such parameters.

According to the invention, a new module is implemented at the HTTP proxy level. This module is responsible for collecting information concerning the behaviour of users during a period of time for determining their profile, by analysing their requests. A package of information is made for each profile and sent to users having the corresponding profile, in multicast mode via Trivial File Transfer Protocol (TFTP). For example, in an IP network, the IP addresses of the users to whom data should be transmitted are identified, and the data is multicast according to a standard content distribution tree.

Figure 1:
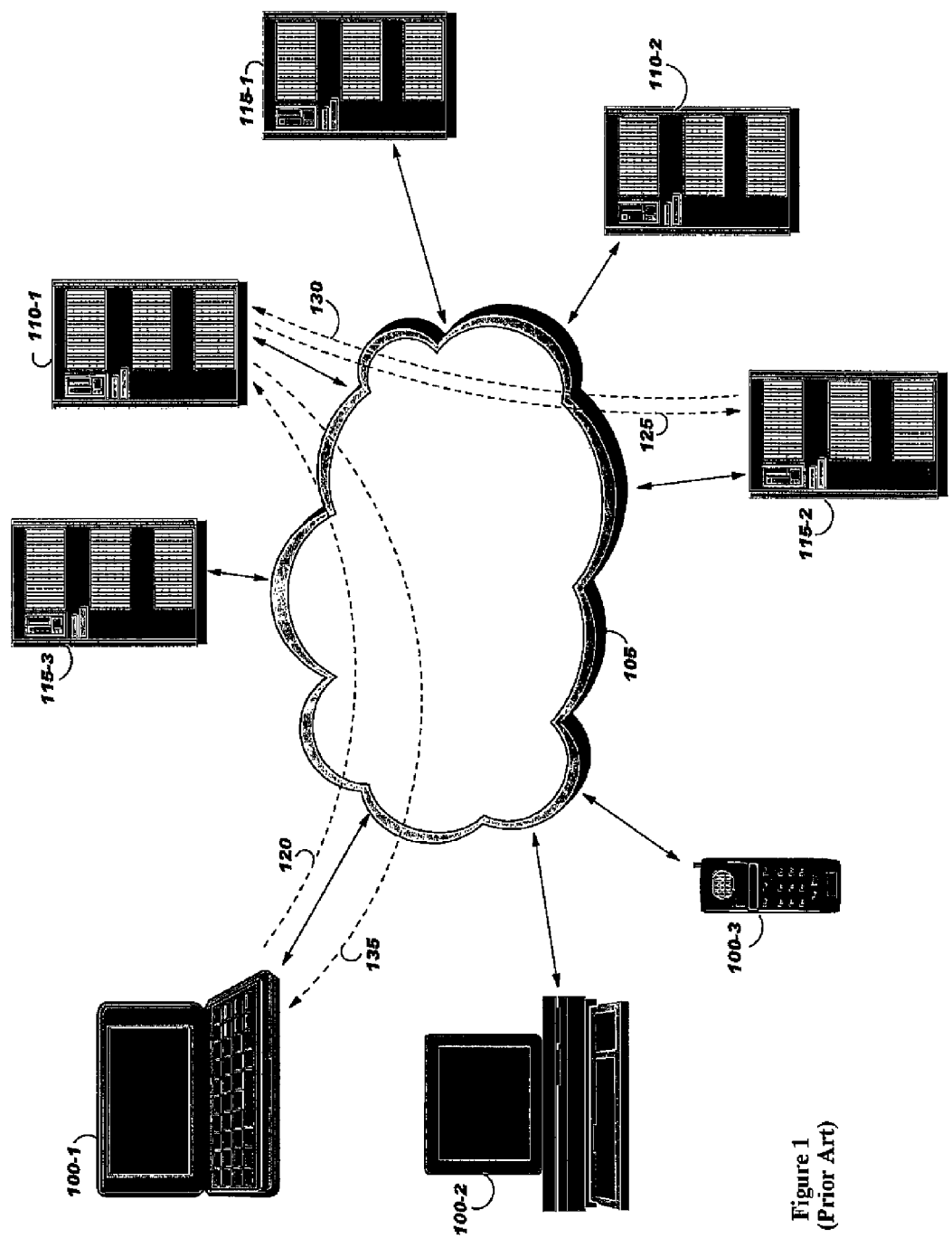
FIG. 1 illustrates a typical network architecture in which the invention can be implemented.

FIG. 1 illustrates a typical network architecture wherein the invention can be implemented. As shown, client browsers operating on computers, personal computers, hand held devices, and the like, generically referred to as 100, are connected to the Internet network 105 through a wireless connection, such as an ADSL connection, a standard Public Switched Telephone Network (PSTN) modem connection, or any kind of network connection. Web browsers use one or more proxy servers, generically referred to as 110, for accessing information stored on web servers, generically referred to as 115. For example, when a user sends a request from laptop 100-1, the request is transmitted to the proxy server 110-1, as shown with dotted-arrow 120. Proxy server 110-1 analyses the request and access the requested information from web server 115-2, as shown with dotted-arrows 125 and 130. When received, the proxy server 110-1 transmits the received data to the client browser of the laptop 100-1, as shown with dotted-arrow 130.

According to the system described by reference to FIG. 1, the data is transmitted using the unicast data transmission mode i.e., a single frame or packet is sent from a single source to a single destination.

Figure 2:
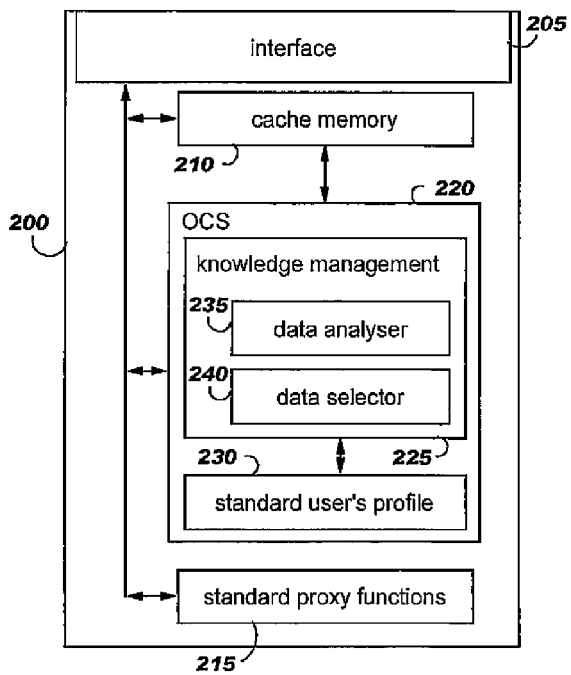
FIG. 2 depicts an embodiment of the HTTP proxy according to the invention, adapted for handling multicast transmission mode.

FIG. 2 depicts a first embodiment of the HTTP proxy server according to the invention, adapted for handling multicast transmission mode where a single data frame or a single source to multiple destinations packet is copied and sent to a specific subset of nodes on the network. According to the invention, the HTTP proxy server 200, having a standard network interface 205, a standard cache memory 210, and the standard module 215 of proxy server functions, further comprises an Optimized Content Server 220 (OCS). Optimized content server 220 includes a knowledge management module 225 and a set of typical user profiles 230. Knowledge management module 225 is a standard knowledge management module, e.g., Lotus WebSphere Portal (Lotus and Websphere are Trademarks of International Business Machine Corporation), comprising a data analyser 235 and a data selector 240.

User profiles mainly consist in sets of requests characterizing typical users. The user profiles can also include notions of time. For example, users requesting worldwide and national news the morning between 7:00 and 8:00, and the evening between 8:00 and 10:00, share the same profile of working people who are interested in news.

Alternatively or additionally, user profiles can be based upon sequences of requests, or paths through different web servers. For example, if a user's profile is associated with the path for accessing a first web server and then to a second web server, this profile will be given to a new user accessing the first web server and then the second web server but it will not be given to a new user accessing the second web server and then the first web server or to a new user accessing the first web server, a third web server, and then the second web server.

The user requests and the accessed data are analysed by the data accesses knowledge management module 225. User requests are compared with the typical requests associated with user profiles to determine the profile of the users having sent the requests. Once the profiles of the users having sent the requests are determined, the accessed data corresponding to the user requests are associated with the corresponding user profiles.

When the profile of the user is determined, all the data associated with this profile is multicast to all the users sharing this determined profile so as to be locally stored on each user's computer, and locally accessed by the users, without requiring further unicast link.

Alternately, for reducing the amount of data multicast to users sharing the same profile, a rule based system can be used when accessing data associated with the profile. For example, only the data accessed by a predetermined ratio of user sharing the same profile can be transmitted, e.g., only the data accessed by 80% of the user sharing the profile are transmitted.

Periodically the data associated with each profile is reset. The reset can be based upon a predetermined delay, e.g., each 24 hours the data associated with each profile is erased, and/or it can be based upon data access frequency, e.g., all the data that are accessed by less than a predetermined threshold are erased. For example, the data that has been accessed by less than 50% of the users corresponding to the profile to which this data is associated, in the last two hours, is erased.

Figure 3:
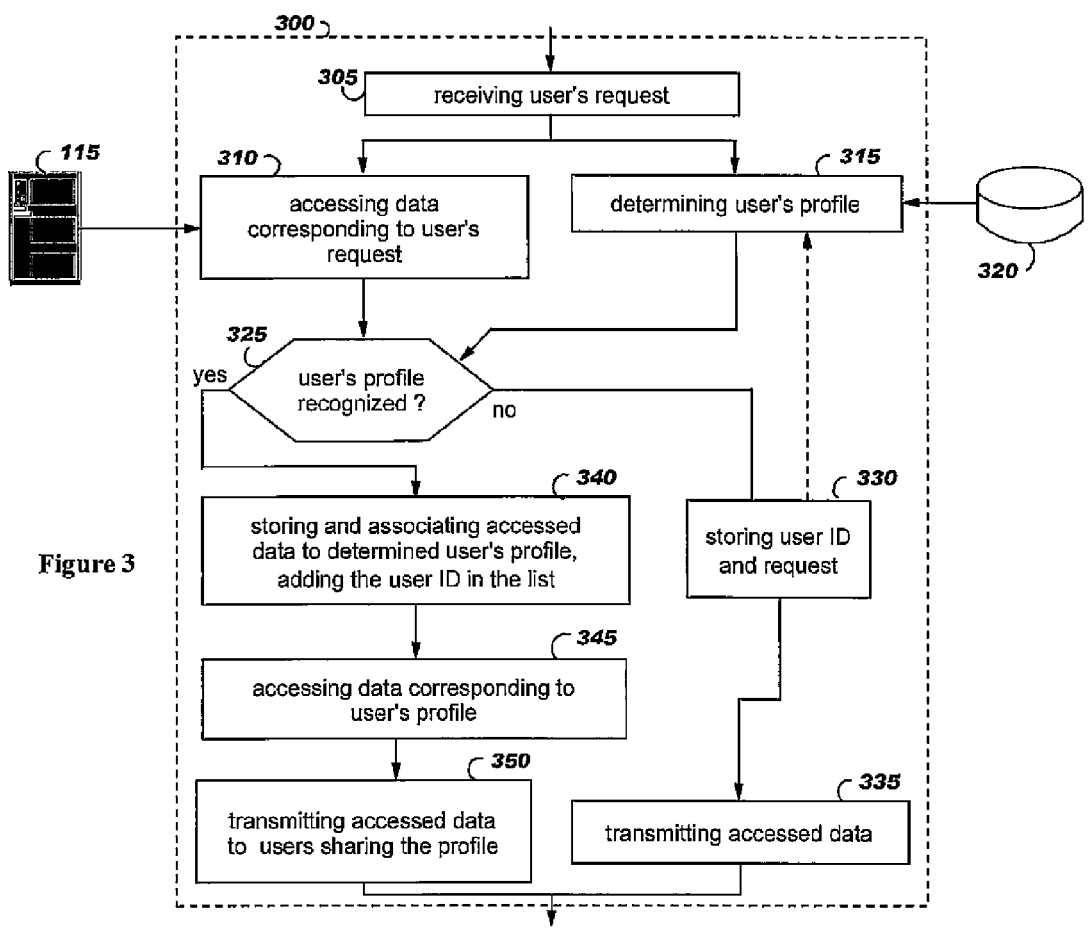
FIG. 3 is an example of an algorithm handling user requests and providing data according to these requests and to user profiles.

FIG. 3 is an example of the algorithm 300 handling user requests and providing data according to these requests, implemented in modules 235 and 240 of FIG. 2. When the HTTP proxy server receives a user's request (step 305), the HTTP proxy server accesses the requested data from a web server 115, through the network, or from the HTTP proxy server memory cache if the data has been locally stored (step 310). Simultaneously, the HTTP proxy server compares the user's request with the requests associated with user profiles for determining the profile of the user having sent the request (step 315), using a set of predetermined profiles 320 that can be locally stored on the HTTP proxy server or accessed through the network. The previous requests of the user may also be used for determining its profile, by comparing several requests of the user to the set of requests associated with each profile, as depicted by the dotted-arrow. If the HTTP proxy server is not able to determine the profile of the user having sent the request (step 325), the user ID and the request is preferably locally stored (step 330) for later recognition of the user's profile, and the accessed data is transmitted to the user (step 335), as done in a classical HTTP proxy server. Else, if the HTTP proxy server is able to determine the profile of the user having sent the request (step 325), the accessed data is locally stored and associated with the profile corresponding the user having sent the request and the user ID of the user having sent the request is added in the list of the users sharing this profile (step 340). Then, the data associated with the profile corresponding the user having sent the request, i.e., the new accessed data and the previously stored data associated with this profile, is accessed (step 345) and the accessed data is transmitted to the all the users having the same profile as the one having sent the request (step 350).

FIG. 4 shows a second embodiment of the HTTP proxy of the invention. The HTTP proxy server of FIG. 4 is similar to the one of FIG. 2 in that the HTTP proxy server 400 having a network interface 405, a cache memory 410, and the standard module 415 of proxy server functions, is modified and comprises an Optimized Content Server 420 (OCS). Optimized content server 420 mainly comprises a knowledge management module 425 and a set of typical user profiles 430. Knowledge management module 425 is a standard knowledge management module comprising a data analyser 435 and a data selector 440. Knowledge management module 425 further comprises a statistic analyser 445, or pro-active suggestion module, adapted to compare the user requests and the data effectively accessed so as to suggest data to be accessed to users sharing the same profile. For each request, the statistic analyser stores the references of the accessed data with a score corresponding to the frequency at which the data has been accessed. When the profile of a user is recognized, the data associated with the profile are transmitted to the user with an indication of the data pertinence.

According to this second embodiment, the statistic analyser preferably comprises a pro-active suggestion table for collecting information and establishing statistics. The table information is preferably defined per Uniform Resource Locator (URL) or key word and per user profile. After a user has sent new requests and his/her profile has been determined, the corresponding data are transmitted to this user with this statistic information that are displayed on the user's screen thanks to a suggestion and statistic screen module of the user's web browser. The suggestion and statistic screen module can take several forms such as a pop-up windows associated with each hot spot, as shown on FIG. 5 with reference 500, or a set of colours representing the statistics.

FIG. 6 illustrates an example of the pro-active suggestion table 600. As shown, pro-active suggestion table 600 comprises a first column 605 for storing user profiles, a second column 610 for storing either the URL from which the user sent his/her request or the key words of his/her request, a third column 615 comprising the URL suggested by the system to the users having the corresponding profile, and a fourth column 620 for storing the percentage of users having the corresponding profile who accessed the suggested URL. It should be noticed that the URL from which the user sent his/her request or the key words of his/her request is optional since an URL can be suggested to all the users having the corresponding profile, whatever the URL from which the user sent his/her request or the key words of his/her request. Each line of the pro-active suggestion table 600 corresponds to one suggested URL. User's profiles of column 1 can be profile's identifiers (as illustrated) or can be descriptive and comprising words like "teenagers", "children", or "adult, 35-45 year old". For example, line 625-$i$ concerns user's profile 1, and allows to inform the users sharing this profile and that requests have been sent from URL "www.CNN.com/iraq.html" that URL "www.CNN.bagdad.iraqmap.html" has been accessed by 54% of the user belonging to the user's profile 1. According to the pro-active suggestion table 600, one could create complex paths since a same URL can be stored in both columns 610 and 615 of two different lines corresponding to a same profile.

To illustrate the system of the invention, consider the following example of Americans looking for international news and more particularly looking for news about Iraq events. After having typed "www.CNN.com" and click on the link "Iraq" associated with the URL "www.CNN.com/iraq.html", the profile is identified by comparing the current URL with the profile's characteristics stored on the proxy server. Such profile can be "adult, 35-45 year old". Once the profile is identified, all the data associated with the user's profile, stored in the memory cache of the proxy server, are multicast to the users having the same profile. For example, the data "video-iraq.mpg", "photo-iraq21.jpg", and "video-aljazira.mpg", as well as the web pages "www.CNN.bagdad.iraqmap.html" and "www.BBC/iraq.html" are multicast. According to the second embodiment, the percentage of users of the same profile having accessed the data and/or the web pages is multicast. For example, the data "video-iraq.mpg (50%)", "photo-iraq21.jpg (57%)", and "video-aljazira.mpg (38%)", as well as the web pages "www.CNN.bagdad.iraqmap.html (81%)" and "www.BBC/iraq.html (65%)" are multicast.

According to a second example, teenagers are looking for an event that happens in a reality show. After discussing of the event at school, they want to look at details on the Internet when coming back at home. To that end, they are using a search engine to transmit their requests, e.g., using a set of keywords. In response, the search engine transmits a web page with hyperlinks for accessing data on various web servers. Since the number of web servers disclosing details on such kind of events is typically limited to the web server associated with the reality show and to web servers hosting news, most of them will access the same web servers.

When the first teenagers send their requests and after their profiles have been recognized as "teenager", the accessed data will be automatically associated with this profile and multicast to all the other teenagers also recognized as "teenager", possibly with an indication of the number of hits done on the accessed web servers.

Thanks to such a multicast mechanism, the required transmission bandwidth is limited since most of them are requiring the same data that are pro-actively stored on their computers.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for multicasting data to users in a network environment from a proxy server comprising a set of predetermined user profiles, the method comprising:
   receiving a request for new data from a user;
   accessing the new data requested by the user;
   determining a profile of the user among the set of user profiles;
   storing the new data within the proxy server;
   associating the stored new data with the user's profile;
   accessing and multicasting, from the proxy server, the stored new data and all previously stored data associated with the user's profile to the user and to all other users sharing the user's profile; and,
   erasing, from the proxy server, the data associated with the user's profile when a percentage of the other users sharing the user's profile who have not accessed the multicast data is less than a predetermined threshold.

2. The method of claim 1, wherein a set of requests is associated with each profile of the set of user profiles, and wherein determining the profile of the user among the set of user profiles further comprises:
   comparing the at least one request of the user with the set of requests associated with each profile of the set of user profiles.

3. The method of claim 2, wherein the set of requests associated with each profile of the set of user profiles is ordered, and wherein determining the profile of the user among the set of user profiles further comprises:
   comparing a sequence of requests of the user with the set of ordered requests associated with each profile of the set of user profiles.

4. The method of claim 1, wherein, if the profile of the user is not recognized among the set of user profiles, transmitting the accessed data requested by the user to the user, wherein transmitting the accessed data requested by the user, to the user, if the profile of the user is not recognized among the set of user profiles, further comprises:
   storing a user identifier and the at least one user's request.

5. The method of claim 1, further comprising:
   for each profile of the set of user profiles and for each data associated with the profile, determining a percentage of users corresponding to the profile who accessed the data.

6. The method of claim 5, further comprising:
   transmitting the determined percentage with the data.

7. The method according to claim 1, wherein the method is implemented within a service provider server.

8. An apparatus for multicasting data to users in a network environment from a proxy server comprising a set of predetermined user profiles, comprising:
   a system for receiving one a request for new data from a user over a network comprising at least one computer device;
   a system for accessing the new data requested by the user;
   a system for determining a profile of the user among the set of user profiles;
   a system for storing the new data within the proxy server, associating the stored new data with the user's profile, accessing and multicasting, from the proxy server, the stored new data and all previously stored data associated with the user's profile to the user and to all other users sharing the user's profile; and
   a system for erasing, from the proxy server, the data associated with the user's profile when a percentage of the other users sharing the user's profile who have not accessed the multicast data is less than a predetermined threshold.

9. The apparatus of claim 8, wherein a set of requests is associated with each profile of the set of user profiles, and wherein the system for determining the profile of the user among the set of user profiles further comprises:
   a system for comparing the at least one request of the user with the set of requests associated with each profile of the set of user profiles.

10. The apparatus of claim 9, wherein the set of requests associated with each profile of the set of user profiles is ordered, and wherein the system for determining the profile of the user among the set of user profiles further comprises:
    a system for comparing a sequence of requests of the user with the set of ordered requests associated with each profile of the set of user profiles.

11. The apparatus of claim 8, further comprising a system for transmitting the accessed data requested by the user to the user, if the profile of the user is not recognized among the set of user profiles wherein the system for transmitting the accessed data requested by the user, to the user, if the profile of the user is not recognized among the set of user profiles, further comprises:
    a system for storing a user identifier and the at least one user's request.

12. The apparatus of claim 8, further comprising:
    a system for determining a percentage of users corresponding to the profile who accessed the data, for each profile of the set of user profiles and for each data associated with the profile.

13. The apparatus of claim 12, further comprising:
    a system for transmitting the determined percentage with the data.

* * * * *